United States Patent [19]

Hasegawa et al.

[11] Patent Number: 4,966,794

[45] Date of Patent: Oct. 30, 1990

[54] ARTIFICIAL STONE MOLDED BODY AND PROCESS FOR FABRICATION THEREOF

[75] Inventors: Hiroaki Hasegawa; Norio Sakai; Kazuhiko Osugi, all of Sakai, Japan

[73] Assignee: Fukuvi Chemical Industry Co., Ltd., Fukui, Japan

[21] Appl. No.: 389,887

[22] Filed: Aug. 4, 1989

[30] Foreign Application Priority Data

Aug. 15, 1988 [JP] Japan ................................ 63-201999

[51] Int. Cl.$^5$ ......................... B32B 27/30; B44F 9/04
[52] U.S. Cl. ........................................ 428/15; 156/61; 264/331.18
[58] Field of Search ........................... 428/15; 156/61; 264/331.18

[56] References Cited

U.S. PATENT DOCUMENTS

| | | | |
|---|---|---|---|
| 4,159,301 | 6/1979 | Buser et al. | 428/15 X |
| 4,232,078 | 11/1980 | Kamada | 428/195 |
| 4,302,497 | 11/1981 | Toyooka et al. | 428/203 |
| 4,415,509 | 11/1983 | Toyooka et al. | 428/338 X |
| 4,631,214 | 12/1986 | Hasegawa | 428/76 X |

Primary Examiner—Henry F. Epstein
Attorney, Agent, or Firm—Sherman and Shalloway

[57] ABSTRACT

Disclosed is a process for fabricating an artificial stone molded body by mixing an inorganic filler such as alumina with a resin binder and polymerizing and curing the mixture. A high-viscosity syrup formed by preliminarily polymerizing a polyol polyallyl carbonate with an ethylenically saturated monomer is used as the resin binder and is mixed with the inorganic filler. According to this process, the polymerization is completed in a short time and the internal stress in the molded body is moderated. The molded body fabricated according to this process is excellent in Barcol hardness, pencil hardness, taper abrasion, Sharpy impact strength, flexural strength, heat resistance and chemical resistance.

15 Claims, No Drawings

ARTIFICIAL STONE MOLDED BODY AND PROCESS FOR FABRICATION THEREOF

BACKGROUND OF THE INVENTION (1) Field of the Invention

The present invention relates to an artificial stone molded body and a process for the fabrication thereof. More specifically, the present invention relates to an artificial stone molded body having a moderated internal stress and excellent quality and appearance, and a process for fabricating this molded body in a short time by hardening an inorganic filler by a resin binder.

(2) Description of the Prior Art

Unsaturated polyesters, epoxy resins and acrylic resins have heretofore been used as the resin binder for the fabrication of artificial stone molded bodies, and recently, acrylic resins are widely used because acrylic resins are excellent in the transparency and weatherability. However, acrylic resins are defective in that the abrasion resistance and weatherability are poor. As the means for overcoming this defect, we proposed use of diethylene glycol bisallyl carbonate as the binder and an artificial stone molded body according to this proposal has been marketed (see Japanese Unexamined Patent Publication No. 61-111953).

The artificial stone molded body according to the above-mentioned proposal has a highest quality as the material, but this technique is defective in that since the polymerization speed is very slow at the molding step, a long time (about 15 hours) is required for completion of the molding. Moreover, since the monomer already has a substantially complete three-dimensional cross-linked structure at the initial stage and is in the state of a gel, hardening is completed in the state where the internal stress is retained. Accordingly, in order to obtain a good molded body, a mold should be carefully selected and a highly skilled technique is required.

SUMMARY OF THE INVENTION

Under this circumstance, the present invention has been completed. It is therefore a primary object of the present invention to provide an artificial stone molded body and a process for the fabrication thereof, in which the molding is completed in a short time, the internal stress is moderated, and the quality and appearance are improved in the product.

The present invention is characterized in that a high-viscosity syrup obtained by preliminarily polymerizing a polyol polyallyl carbonate monomer with an ethylenically unsaturated monomer having a higher polymerization speed than that of the polyol polyallyl carbonate monomer is used as the binder for an inorganic filler. The syrup is used in an amount of 20 to 80% by weight and the inorganic filler is used in an amount of 20 to 80% by weight.

The above-mentioned syrup is polymerized and cured in the presence of a radical polymerization initiator, and the polymerization is completed within about 4 hours.

More specifically, in accordance with the present invention, there is provided a process for the fabrication of an artificial stone molded body, which comprises filling in a mold a composition comprising 20 to 80% by weight of a high-viscosity syrup obtained by preliminarily polymerizing a polyol polyallyl carbonate with an ethylenically unsaturated monomer having a higher polymerization speed than that of the polyol polyallyl carbonate monomer and 20 to 80% by weight of an inorganic filler and further containing a catalytic amount of a radical polymerization initiator, and polymerizing the composition.

Furthermore, according to the present invention, there is provided an artificial stone molded body, which is formed from 20 to 80% by weight of a high-viscosity syrup obtained by preliminarily polymerizing a polyol polyallyl carbonate monomer with an ethylenically unsaturated monomer having a higher polymerization speed than that of the polyol polyallyl carbonate monomer and 20 to 80% by weight of an inorganic filler.

DETAILED DESCRIPTION OF THE PREFERRED EMBODIMENTS

According to the process of the present invention for the fabrication of an artificial stone molded body, a monomer having a higher polymerization speed than that of a polyol polyallyl carbonate and being capable of forming a linear polymer, that is, an ethylenically unsaturated monomer, which acts like a dispersion medium, is added to the polyol polyallyl carbonate. The added ethylenically unsaturated monomer acts like a dispersion medium and is gradually polymerized in the polyol polyallyl carbonate which is being formed into a molded body having an excellent chemical resistance, and the composition passes through the state of a highly viscous syrup and gelation reaction is advanced.

It is known that when a polyol polyallyl carbonate monomer is formed into a molded body, it has excellent heat resistance and chemical resistance. However, as is apparent from Comparative Example 1 given hereinafter, a long time is required for forming a molded body only from the polyol polyallyl carbonate monomer. Moreover, no sufficient preliminary polymerization is observed at the step of forming the syrup, and setting of the polymerization temperature is difficult at the subsequent molding step. Therefore, the temperature is gradually elevated according to the conventional technique.

In contrast, according to the present invention, by adding an ethylenically unsaturated monomer having a higher polymerization speed, the polymerization of the polyol polyallyl carbonate is induced by the added polymer, and the preliminary polymerization becomes possible. Accordingly, the polymerization temperature can be easily set at the subsequent step and molding is completed in a short time.

By this preliminary polymerization, a high-viscosity syrup of the polyol polyallyl carbonate monomer and the ethylenically unsaturated monomer is formed. As is apparent from Examples 1 through 4 and Comparative Example 1 given hereinafter, by dint of this high-viscosity syrup, the polymerization temperature can be easily set and the polymerization time can be greatly shortened. In the high-viscosity syrup, it is preferred that the ethylenically unsaturated monomer be used in an amount of 5 to 80% by weight, especially 25 to 75% by weight, based on the total of polyol polyallyl carbonate monomer and the ethylenically unsaturated monomer. It also is preferred that the viscosity of the high-viscosity syrup be 400 to 2000 cps.

The molded body comprising the polyol polyallyl carbonate and ethylenically unsaturated monomer in the above-mentioned amounts is excellent in Barcol hardness, pencil hardness, taper abrasion, Sharpy impact strength, bending strength, heat resistance and chemical resistance. With respect to the Barcol hardness, when this molded body is compared with a molded body composed solely of the polyol polyallyl carbonate, shown in Comparative Example 1, it is seen that a significant effect is attained. The reason is that the polyol polyallyl carbonate monomer acts as a dispersion medium for the ethylenically unsaturated monomer, and the internal stress in the molded body is moderated at the molding step.

The molded body composed solely of the ethylenically unsaturated monomer is inferior in Barcol hardness, pencil hardness, bending strength and heat resistance, but in the present invention, even if the ethylenically unsaturated monomer is incorporated, these mechanical strength and heat characteristics are not degraded in the molded body. It is considered that this is due to the preliminary polymerization of the ethylenically unsaturated monomer and polyol polyallyl carbonate monomer.

Preferred embodiments of the artificial stone molded body and the process for the fabrication thereof according to the present invention will now be described.

According to the present invention, a high-viscosity syrup is formed from a polyol polyallyl carbonate monomer and an ethylenically unsaturated monomer, and an inorganic filler is incorporated into the syrup and polymerization and curing are carried out in the presence of a radical polymerization initiator.

POLYOL POLYALLYL CARBONATE MONOMER

The polyol polyallyl carbonate used in the present invention is represented by the following general formula:

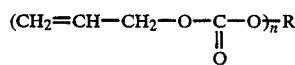   (1)

wherein n is a positive integer of at least 2, preferably 2 or 3, and R stands for a polyol residue.

As the polyol component constituting the monomer represented by the general formula (1), there can be mentioned ethylene glycol, propylene glycol, 1,4-butanediol, neopentyl glycol, 1,6-hexane-diol, diethylene glycol, triethylene glycol, glycerol, trimethylolpropane, pentaerythritol and dipentaerythritol. The polyol polyallyl carbonate used in the present invention can be a mixture of a plurality of monomers differing in the polyol component.

A glycol diallyl carbonate is preferable for attaining the object of the present invention, and diethylene glycol diallyl carbonate is especially preferred.

The monomer used in the present invention has a plurality of allyl groups in the molecule and is characterized in that a three-dimensionally crosslinked polycarbonate is formed by polymerization and curing of this monomer. This three-dimensionally crosslinked polycarbonate is used as the binder of the artificial stone molded body.

In the present invention, by using the abovementioned monomer for the fabrication of an artificial stone molded body, the inherent characteristics of the crosslinked polycarbonate, such as high heat resistance, high abrasion resistance, high chemical resistance and high strength, can be given to the artificial stone molded body, and if silica or alumina hydrate is used as the filler for this resin, the molding shrinkage can be controlled and the material cost can be reduced, and an artificial stone molded body having a good appearance as a whole and having an excellent chemical resistance can be obtained.

ETHYLENICALLY UNSATURATED MONOMER

The ethylenically unsaturated monomer used in the present invention has a polymerization speed higher than that of the above-mentioned polyol polyallyl carbonate. When this monomer is added to the polyol polyallyl carbonate, the preliminary polymerization of this ethylenically unsaturated monomer and the polyol polyallyl carbonate monomer is caused, and a high-viscosity syrup is formed. As the monomer suitable for attaining this object, acrylic and methacrylic monomers, especially monomers represented by the following general formula, are preferably used:

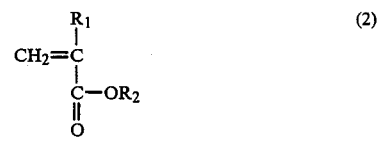   (2)

wherein $R_1$ stands for a hydrogen atom or a lower alkyl group, and $R_2$ stands for a hydrocarbon group.

As specific examples of the monomer represented by the general formula (2), there can be mentioned methyl methacrylate, ethyl methacrylate, ethyl acrylate, butyl acrylate and amyl acrylate. These monomers can be used singly or in the form of a mixture of two or more of them, or they can be used in combination with other monofunctional monomer such as styrene. Methyl methacrylate is most preferred, and methyl methacrylate can be used in the form of a monomer or in the state preliminarily polymerized more or less. However, in order to attain a sufficient effect with a small amount, it is preferred that methyl methacrylate be used in the form of a monomer.

HIGH-VISCOSITY SYRUP

In the high-viscosity syrup, it is preferred that the ethylenically unsaturated monomer be used in an amount of 5 to 80% by weight, especially 25 to 75% by weight, and the polyol polyallyl carbonate is used in an amount of 25 to 90% by weight, each based on the total monomers. If the amount of the ethylenically unsaturated monomer is too small and below the above-mentioned range, it is difficult to sufficiently moderate the internal stress in the polymer and the polymerization speed does not increase. If the amount of the ethylenically unsaturated monomer is too large and exceeds the above-mentioned range, the function of the diallyl carbonate monomer as the dispersion medium is insufficient and the chemical resistance is degraded.

The high-viscosity syrup is formed in an atmosphere maintained at 50° to 60° C. It is preferred that the viscosity of the high-viscosity syrup used be 400 to 2000 cps, especially 500 to 1000 cps.

If the viscosity of the high-viscosity syrup is too low and below the above-mentioned range, the polymerization time cannot be shortened and the internal stress is not sufficiently moderated. If the viscosity exceeds the above-mentioned range, the preliminary polymerization is advanced too rapidly, and handling of the composition becomes difficult.

FILLER

In the present invention, a chemically inert or relatively inert filler is used. A fine powdery product of silica or alumina hydrate is used because this filler has a good compatibility with the monomers and gives a relatively low molding shrinkage.

A fine powdery product of silica, especially one formed from a high-purity quartz rock, is not corroded by any substance other than hydrofluoric acid, and is chemically stable. Furthermore, since this filler is low in the heat conductivity the heat resistance of the molded body is improved. Alumina trihydrate is corroded by a strong acid and a strong alkali, but gives a valuable product which is improved in the flame retardancy and chemical resistance, especially in the chemical resistance, over a conventional product formed by an acrylic resin.

It is generally preferred that the particle size of silica or alumina hydrate be 1 to 30$\mu$, especially 5 to 20$\mu$.

COMPOSITION

In the present invention, the high-viscosity syrup of the polyol polyallyl carbonate and the ethylenically unsaturated monomer and the inorganic filler are used at such a ratio that the amount of the high-viscosity syrup is 20 to 80% by weight, especially 30 to 50% by weight, and the amount of the inorganic filler is 20 to 80% by weight, especially 50 to 70% by weight. If the amount of the filler is too small and below the above-mentioned range, a good appearance or touch characteristic cannot be obtained in the artificial stone molded body, and the molding shrinkage increases or the cost tends to rise. If the amount of the syrup is too small and below the above-mentioned range, homogeneous mixing of the inorganic filler becomes difficult, and the mechanical strength and abrasion resistance is degraded.

The polymerization and curing of the polyol polyallyl carbonate can be initiated by heat or radiation, but it is generally preferred that a radical polymerization initiator be incorporated in the composition comprising the monomers and filler.

As the radical polymerization initiator, there can be mentioned peroxides such as benzoylperoxide t-butyl hydroperoxide, cumene hydroperoxide, di-t-butyl peroxide, t-butyl peroxybenzoate, lauroyl peroxide, diisopropyl peroxydicarbonate and methylethylketone peroxide, and azo compounds such as azobisisobutyronitrile and azobisisovaleronitrile. It is preferred that the radical polymerization initiator be made present in an amount of 1 to 5% by weight, especially 2.5 to 4% by weight, based on the monomers. The radical polymerization initiator can be used in combination with a promoter such as an amino acid or a metal salt.

Known additives can optionally be incorporated into the composition of the present invention according to a known recipe. For example, a white or color pigment or a flake pigment can be incorporated for coloring the molded body.

The above-mentioned components are intimately mixed in the open air or if necessary in an inert atmosphere. Then, the mixture is defoamed if necessary and is filled in a mold, and polymerization curing is carried out at a temperature of 50° to 120° C. for 3 to 8 hours. The polymerization temperature can be set at a predetermined level. In order to shorten the reaction time and control occurrence of violent polymerization, it is preferred that the reaction temperature be within the above-mentioned range. This temperature range is especially preferable for shortening the reaction time.

MOLDED BODY

The artificial stone molded body obtained according to the present invention is excellent in the chemical resistance, heat resistance and transparency, and furthermore, by addition of the ethylenically unsaturated monomer, polymerization molding can be accomplished in a short time. In case of a conventional molded body in which the ethylenically unsaturated monomer is not incorporated, the time required for one molding cycle is 15 hours, but in contrast, in case of the artificial stone molded body of the present invention, the time required for one molding cycle is shortened to 4 to 6 hours, and a product having constant mechanical strength and characteristics can be obtained.

Furthermore, in the artificial stone molded body of the present invention, since gelation is advanced through the state of the high-viscosity syrup, the internal stress in the molded body is moderated, and an artificial stone product which has a high mechanical strength and is excellent in the quality and appearance can be obtained.

The present invention will now be described in detail with reference to the following examples that by no means limit the scope of the invention.

EXAMPLE

A mixture comprising 50% by weight of diethylene glycol bisallyl carbonate monomer and 50% by weight of methyl methacrylate and further containing 1% by weight of diisopropyl peroxydicarbonate was placed in an atmosphere maintained at 50° C. to form a syrup having a viscosity of 600 cps.

Then, a mixture comprising 40% by weight of the so-prepared syrup and 60% by weight of aluminum hydroxide powder was formed, and 2% by weight of diisopropyl peroxydicarbonate and 1% by weight of benzoyl peroxide were added and the mixture was stirred. The mixture was defoamed under vacuum, filled in a glass cell and polymerized. The polymerization was conducted at a polymerization temperature of 60° C. for 2 hours and at a polymerization temperature of 90° C. for 2 hours, that is, for 4 hours as a whole, to obtain an artificial stone molded body having a good appearance.

The obtained molded body had the following properties.

(1) Barcol hardness: 60 (JIS K-9911)
(2) Pencil hardness: 5H (JIS K-5400)
(3) Taper wear quantity: 0.2 g (JIS K-6902)
(4) Sharpy impact strength: 6.5 kgf/cm$^2$ (JIS K-7111)
(5) Flexural strength: 970 kgf/cm$^2$ (JIS K-7203)
(6) Heat resistance: not changed when contracted with an iron at 200° C. for 5 minutes
(7) Chemical resistance: not changed when the appearance was examined after 24 hours' immersion in 10% hydrochloric acid, 10% ammonia, water, methyl alcohol or acetone

EXAMPLE 2

A mixture comprising 40% by weight of the syrup obtained under the same conditions as in Example 1 and 60% by weight of aluminum hydroxide powder was mixed with 3% by weight of benzoyl peroxide, and the mixture was stirred and defoamed under vacuum. The mixture was filled in a glass cell and the polymerization was conducted at a polymerization temperature of 85° C. for 5 hours and at a polymerization temperature of 110° C. for 1 hour, that is, for 6 hours as a whole, to obtain an artificial stone molded body having a good appearance.

The obtained molded body had the following properties.

(1) Barcol hardness: 66 (JIS K-9911)
(2) Pencil hardness: 5H (JIS K-5400)
(3) Taper wear quantity: 0.2 g (JIS K-6902)
(4) Sharpy impact strength: 7.0 kgf/cm$^2$ (JIS K-7111)
(5) Flexural strength: 990 kgf/cm$^2$ (JIS K-7203)
(6) Heat resistance: not changed when contacted with an iron at 200° C. for 5 minutes
(7) Chemical resistance: not changed when the appearance was examined after 24 hours' immersion in 10% hydrochloric acid, 10% ammonia, water, methyl alcohol or acetone

EXAMPLE 3

A mixture comprising 40% by weight of the syrup obtained under the same conditions as in Example 1 and by weight of aluminum hydroxide powder was mixed with 2% by weight of diisopropyl peroxy dicarbonate and by weight of benzoyl peroxide, and the mixture was stirred and defoamed under vacuum. The mixture was filled in a glass cell and the polymerization was conducted at a polymerization temperature of 60° C. for 2 hours and at a polymerization temperature of 90° C. for 2 hours, that is, for 4 hours as a whole, to obtain an artificial stone molded body having a good appearance.

The obtained molded body had the following properties.

(1) Barcol hardness: 68 (JIS K-9911)
(2) Pencil hardness: 7H (JIS K-5400)
(3) Taper wear quantity: 0.1 g (JIS K-6902)
(4) Sharpy impact strength: 10.5 kgf/cm$^2$ (JIS K-7111)
(5) Flexural strength: 1900 kgf/cm$^2$ (JIS K-7203)
(6) Heat resistance: not changed when contacted with an iron at 200° C. for 5 minutes
(7) Chemical resistance: not changed when the appearance was examined after 24 hours' immersion in 10% hydrochloric acid, 1 % ammonia, water, methyl alcohol or acetone

EXAMPLE 4

A mixture comprising 70% by weight of diethylene glycol bisallyl carbonate monomer and 30% by weight of methyl methacrylate and further containing 1% by weight of diisopropyl peroxydicarbonate was placed in an atmosphere maintained at 50° C. to form a syrup having a viscosity of 580 cps.

Then, a mixture comprising 40% by weight of the so-prepared syrup and 60% by weight of aluminum hydroxide powder was formed, and 2% by weight of diisopropyl peroxydicarbonate and 1% by weight of benzoyl peroxide were added and the mixture was stirred. The mixture was defoamed under vacuum, filled in a glass cell and polymerized. The polymerization was conducted at a polymerization temperature of 60° C. for 3 hours and at a polymerization temperature of 90° C. for 2 hours, that is, for 5 hours as a whole, to obtain an artificial stone molded body having a good appearance.

The obtained molded body had the following properties.

(1) Barcol hardness: 60 (JIS K-9911)
(2) Pencil hardness: 5H (JIS K-5400)
(3) Taper wear quantity: 0.15 g (JIS K-6902)
(4) Sharpy impact strength: 7.2 kgf/cm$^2$ (JIS K-7111)
(5) Flexural strength: 100 kgf/cm$^2$ (JIS K-7203)
(6) Heat resistance: not changed when cotacted with an iron at 200° C. for 5 minutes
(7) Chemical resistance: not changed when the appearance was examined after 24 hours' immersion in 10% hydrochloric acid, 10% ammonia, water, methyl alcohol or acetone

COMPARATIVE EXAMPLE 1

A mixture comprising diethylene glycol bisallyl carbonate monomer and 1% by weight of diisopropyl peroxydicarbonate was placed in an atmosphere maintained at 50° C. to form a syrup having a viscosity of 550 cps. Then, a mixture comprising 40% by weight of the so-prepared syrup and 60% by weight of aluminum hydroxide powder was formed, and 3% by weight of diisopropyl peroxydicarbonate was added and the mixture was stirred. The mixture was defoamed under vacuum, filled in a glass cell and polymerized.

The polymerization was completed in 15 hours while gradually elevating the temperature from 50° C. to 90° C., and when the temperature-elevating state was good, a molded body having a good appearance was obtained.

The obtained mold body had the following properties.

(1) Barcol hardness: 58 (JIS K-9911)
(2) Pencil hardness: 5H (JIS K-5400)
(3) Taper wear quantity: 0.15 g (JIS K-6902)
(4) Sharpy impact strength: 7.0 kgf/cm$^2$ (JIS K-7111)
(5) Flexural strength: 980 kgf/cm$^2$ (JIS K-7203)
(6) Heat resistance: not changed when contacted with an iron at 200° C. for 5 minutes
(7) Chemical resistance: not changed when the appearance was examined after 24 hours' immersion in 10% hydrochloric acid, 10% ammonia, water, methyl alcohol or acetone.

The molded body was excellent in the physical properties, but the molded body was defective in that a long time was required for the polymerization and curing.

COMPARATIVE EXAMPLE 2

A mixture comprising diethylene glycol bisallyl carbonate monomer and 0.5% by weight of benzoyl peroxide was placed in an atmosphere maintained at 50° C. to form a syrup having a viscosity of 650 cps.

Then, a mixture comprising 40% by weight of the so-prepared syrup and 60% by weight of aluminum hydroxide powder was formed, and 2% by weight of benzoyl peroxide was added and the mixture was stirred. The mixture was defoamed under vacuum, filled in a glass cell and polymerized. The polymerization was conducted at a polymerization temperature of 85° C. for 3 hours and at a polymerization temperature of 110° C. for 1 hour, that is, for 4 hours as a whole, to obtain an artificial stone molded body having a good appearance.

The obtained molded body had the following properties.

(1) Barcol hardness: 56 (JIS K-9911)
(2) Pencil hardness: 4H (JIS k-5400)
(3) Taper wear quantity: 0.5 g (JIS k-6902)
(4) Sharpy impact strength: 5.0 kgf/cm$^2$ (JIS K-7111)
(5) Flexural strength: 570 kgf/cm$^2$ (JIS K-7203)

(6) Heat resistance: not changed when contacted with an iron at 150° C. for 5 minutes but whitened when contacted with an iron at 200° C. for 5 minutes (7) Chemical resistance: not changed when the appearance was examined after 24 hours' immersion in 10% hydrochloric acid, 10% ammonia, water, or methyl alcohol, but a partially changed after 24 hours' immersion in acetone.

The molded body was inferior to the molded bodies obtained in Examples 1 through 4 in the scratch resistance of the surface, the mechanical strength and the heat resistance.

The artificial stone molded bodies prepared in Examples 2 and 4 and Comparative Example 1 were contacted with contaminants described below for 24 hours, and then, they were washed with detergents described below. The contamination states of the surfaces were examined with the naked eye and evaluated as follows.

O: contamination was completely removed
Δ: contamination was almost removed
X: contamination was left The results obtained with respect to the molded body of Comparative Example 2 are shown in Table 1, and the results obtained with respect to the molded bodies of Examples 2 and 4 are shown in Table 2.

TABLE 1

| Contaminants | Washing Method | | | |
|---|---|---|---|---|
| | water washing | synthetic detergent | bleaching agent | Cleanser |
| Tabasco | Δ | O | | |
| hair tonic | X | X | X | Δ |
| nail-polish remover | X | X | X | Δ |
| mercurochrome | X | X | Δ | O |
| vermilion ink | X | X | X | O |

TABLE 2

| Contaminants | Washing Method | | | |
|---|---|---|---|---|
| | water washing | synthetic detergent | bleaching agent | Cleanser |
| Tabasco | O | | | |
| hair tonic | O | | | |
| nail-polish remover | O | | | |
| mercurochrome | Δ | Δ | O | |
| vermilion ink | Δ | O | | |

From the results shown in Tables 1 and 2, it is seen that the molded bodies of Examples 2 and 4 were excellent over the molded body of Comparative Example 2 in the stain resistance, especially the stain resistance against a contaminant of a solvent type and a contaminant having a highly coloring property.

What is claimed is:

1. A process for the fabrication of an artificial stone molded body, which comprises preliminarily polymerizing 20 to 95% by weight, based on the total monomers, of a polyol polyallyl carbonate with 5 to 80% by weight, based on the total monomers, of an ethylenically unsaturated monomer having a higher polymerization speed than that of the polyol polyallyl carbonate monomer to prepare a high-viscosity syrup, mixing with said syrup 20 to 80% by weight of an inorganic filler and a catalytic amount of radical polymerization initiator to prepare a composition, filling the composition into a mold, and heating the composition in the mold to polymerize the composition.

2. A process according to claim 1, wherein the inorganic filler is a fine powder selected from the group consisting of silica and aluminum trihydrate and has a particle size of 1 to 30μ.

3. A process according to claim 1, wherein the high-viscosity syrup has a viscosity of 400 to 2000 cps.

4. A process according to claim 1, wherein the polyol polyallyl carbonate is diethylene glycol bisallyl carbonate.

5. A process according to claim 1, wherein the ethylenically unsaturated monomer is an acrylic acid ester or a methacrylic acid ester.

6. A process according to claim 5, wherein the ethylenically unsaturated monomer is methyl methacrylate.

7. A process according to claim 4, wherein the ethylenically unsaturated monomer is an acrylic acid ester or a methacrylic acid ester.

8. A process according to claim 4, wherein the ethylenically unsaturated monomer is methyl methacrylate.

9. A process according to claim 1, wherein the composition is heated in the mold at a temperature of 50° C. to 120° C. for 3 to 8 hours to polymerize the composition.

10. A process for the fabrication of an artificial stone molded body, which comprises preliminarily polymerizing 20 to 95% by weight, based on the total monomers, of diethylene glycol bisallyl carbonate with 5 to 80% by weight, based on the total monomers, of methyl methacrylate to prepare a syrup having a viscosity of 400 to 2000 cps, mixing with said syrup 20 to 80% by weight of an inorganic filler selected from the group consisting of silica and aluminum trihydrate and having a particle size of 1 to 30μ and a catalytic amount of radical polymerization initiator to prepare a composition, filling the composition into a mold, and heating the composition in the mold to polymerize the composition.

11. An artificial stone formed body which comprises a composition comprising (i) 20 to 80% by weight of a three-dimensionally crosslinked binder resin consisting essentially of 20 to 95% by weight, based on the total monomers, of diethylene glycol bisallyl carbonate and 5 to 80% by weight, based on the total monomers, of methyl methacrylate and (ii) 80 to 20% by weight of an inorganic filler selected from the group consisting of silica and aluminum trihydrate and having a particle size of 1 to 30μ, said composition being obtained by mixing a high-viscosity syrup of a preliminary polymerization product of the ethylene glycol bisallyl carbonate and methyl methacrylate with the inorganic filler, filling the mixture in a mold and polymerizing the mixture in the mold.

12. An artificial stone formed body which is obtained by the process of claim 1.

13. A process according to claim 1, wherein the high-viscosity syrup has a viscosity of 500 to 1000 cps.

14. A process according to claim 1, wherein the amount of the ethylenically unsaturated monomer is 25 to 75% by weight, based on the total monomer.

15. An artificial stone body formed according to the process of claim 8, wherein the amount of methyl methacrylate is from 25 to 75% by weight, based on the total monomers.

* * * * *